US011048679B2

(12) United States Patent
Kandukuri et al.

(10) Patent No.: US 11,048,679 B2
(45) Date of Patent: Jun. 29, 2021

(54) ADAPTIVE RESOLUTION HISTOGRAM ON COMPLEX DATATYPES

(71) Applicant: Oracle International Corporation, Redwood Shores, CA (US)

(72) Inventors: Anantha Kiran Kandukuri, Zurich (CH); Sam Idicula, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 453 days.

(21) Appl. No.: 15/798,959

(22) Filed: Oct. 31, 2017

(65) Prior Publication Data

US 2019/0129984 A1  May 2, 2019

(51) Int. Cl.
  G06F 16/22       (2019.01)
  G06F 16/21       (2019.01)
  G06F 16/901      (2019.01)
  G06F 16/27       (2019.01)
  G06F 16/29       (2019.01)
  G06F 16/2458     (2019.01)

(52) U.S. Cl.
  CPC .......... G06F 16/2264 (2019.01); G06F 16/21 (2019.01); G06F 16/278 (2019.01); G06F 16/9027 (2019.01); G06F 16/2462 (2019.01); G06F 16/29 (2019.01)

(58) Field of Classification Search
  CPC .............. G06F 16/2246; G06F 16/217; G06F 16/9024; G06F 17/2247; G06F 16/322
  See application file for complete search history.

(56) References Cited

U.S. PATENT DOCUMENTS

| 6,252,605 | B1 | 6/2001 | Beesley et al. |
| 6,460,045 | B1 | 10/2002 | Aboulnaga et al. |
| 6,959,304 | B1 | 10/2005 | Teig et al. |
| 7,043,494 | B1 | 5/2006 | Joshi |
| 7,725,425 | B2 | 5/2010 | Smartt |
| 7,769,733 | B2 | 8/2010 | Chen et al. |
| 8,762,362 | B1 | 6/2014 | Sathe |

(Continued)

OTHER PUBLICATIONS

Pemberton, U.S. Appl. No. 14/621,204, filed Feb. 12, 2012, Final Office Action, dated May 24, 2018.

(Continued)

*Primary Examiner* — Apu M Mofiz
*Assistant Examiner* — Cindy Nguyen
(74) *Attorney, Agent, or Firm* — Hickman Becker Bingham Ledesma LLP

(57) ABSTRACT

Techniques herein map between key spaces to generate a balanced adaptive resolution histogram for dataset partitioning. In embodiments, a computer (C) creates a mapping that associates sparse keys (SKs) with distinct dense keys. C constructs a trie by processing each item of a dataset as follows. Based on the item, C obtains an SK. C navigates from a root NT (node of the trie) to a particular NT based on a sequence of dense digits (SDD). Each dense digit of the SDD is based on the mapping. Each NT identifies a dense prefix comprising dense digits. C assigns the item to a target node based on a threshold and count of items assigned to a subtree rooted at the particular node. C determines a range of SKs for each partition of the dataset, based on: an item count for a node or subtree, dense prefixes of NTs, and the mapping.

18 Claims, 5 Drawing Sheets

(56) References Cited

U.S. PATENT DOCUMENTS

| | | |
|---|---|---|
| 2004/0243553 A1 | 12/2004 | Bailey |
| 2006/0184519 A1 | 8/2006 | Smartt |
| 2007/0156842 A1 | 7/2007 | Vermeulen |
| 2008/0114765 A1 | 5/2008 | Asai |
| 2010/0328115 A1* | 12/2010 | Binnig ............... G06F 16/24561 341/51 |
| 2011/0128960 A1 | 6/2011 | Bando |
| 2011/0145244 A1 | 6/2011 | Kim et al. |
| 2012/0047181 A1 | 2/2012 | Baudel |
| 2013/0060547 A1 | 3/2013 | Beran et al. |
| 2013/0294450 A1 | 11/2013 | Wang |
| 2014/0201474 A1 | 7/2014 | Kirazci |
| 2015/0049944 A1 | 2/2015 | Bamba et al. |
| 2015/0178305 A1* | 6/2015 | Mueller ................. G06F 16/221 707/693 |
| 2016/0239528 A1* | 8/2016 | Pemberton ............. G06F 16/21 |
| 2017/0061085 A1* | 3/2017 | Nossal .................. G06F 19/328 |

OTHER PUBLICATIONS

Pemberton, U.S. Appl. No. 14/621,204, filed Feb. 12, 2015, Notice of Allowance, dated Aug. 30, 2018.

Pemberton, U.S. Appl. No. 14/621,204, filed Feb. 12, 2015, Interview Summary, dated Aug. 6, 2018.

Jimenez-Gonzalez et al., "Communication Conscious Radix Sort" dated 1999, 18 pages.

Beckmann N. et al., "The R*-tree: An Efficient and Robust Access Method for Points and Rectangles" 1990 ACM (10 pages).

Bentley, J., "Multidimensional Binary Search Trees Used for Associative Searching", 1975 ACM Student Award (9 pages).

Blelloch et al., "A Comparison of Sorting Algorithms for the Connection Machine CM-2", dated 1991, 24 pages.

Bruno et al., "Advanced Join Strategies for LargeScale Distributed Computation", Proceedings of the VLDB Endowment, vol. 7, No. 13, Copyright 2014, 12 pages.

Eberhardt, H. et al., "Density Trees for Efficient Nonlinear State Estimation," Proceedings of the 13th International Conference on Information Fusion, Edinburgh, United Kingdom, Jul. 2010 (8 pages).

Gao et al., "A Variable Bin Width Histogram Based Image Clustering Algotrithm", IEEE, dated 2010, 7 pages.

Acharya, S. et al., "Selectivity Estimation in Spatial Databases", SIGMOD 1999 (12 pages).

Ioannidis et al, "Balance Histogram Optimality and Practicality for Query Result Size Estimation", SIGMOD, dated 1995, 12 pages.

Wald, I. et al., "On building fast kd-Trees for Ray Tracing, and on doing that in O" (N log N) IEEE Symposium on Interactive Ray Tracing 2006 (9 pages).

Kim et al., "CloudRAMSort: Fast and Efficient Large-Scale Distributed RAM Sort on Shared-Nothing Cluster", SIGMOD '12, dated May 20-24, 2012, 10 pages.

Lu et al., "AdaptDB: Adaptive Partitioning for Distributed Joins", Proceedings of the VLDB Endowment, vol. 10, No. 5 Copyright 2017, 12 pages.

Niloufar et al., "Non-blocking Patricia Tires with Replace Operations" dated 2013, IEEE 33rd International Conference on Distributed Computing Systems Philiadelphia, PA, dated Jul. 2013, pp. 216-225.

Paul M. Aoki, "How to Avoid Buliding DataBlades That Know the Value of Everything and the Cost of Nothing", Computer Science Divison, EECS Department, University of California, Berkeley, 12 pgs.

Piatetsky-Shapiro, "Accurate Estimation of the Number of Tuples Satisfying a Condition", ACM, dated 1984, 21 pages.

Rodiger et al, "Flow-Join: Adaptive Skew Handling for Distributed Joins over High-Speed Networks", dated May 2016, 12 pages.

Samet, H. et al., "Storing a Collection of Polygons Using Quadtrees", ACM Transactions on Graphics, Jul. 3, 1985 (41 pages).

Guttman, A., "R-Trees: A Dynamic Index Structure for Spatial Searching", 1984 ACM (11 pages).

U.S. Appl. No. 13/966,691, filed Aug. 14, 2013, Supplemental Notice of Allowability, dated Feb. 24, 2016.

U.S. Appl. No. 13/966,691, filed Aug. 14, 2013, Office Action, dated Jun. 2, 2015.

U.S. Appl. No. 13/966,691, filed Aug. 14, 2013, Notice of Allowance, dated Sep. 1, 2015.

Pemberton, U.S. Appl. No. 14/621,204, filed Feb. 12, 2015, Office Action, dated Sep. 13, 2017.

* cited by examiner

ADAPTIVE RESOLUTION HISTOGRAM ON COMPLEX DATATYPES

CROSS-REFERENCE TO RELATED APPLICATIONS

Related U.S. application Ser. No. 14/621,204, filed Feb. 12, 2015, titled "Adaptive Resolution Histogram," is incorporated by reference.

FIELD OF THE DISCLOSURE

This disclosure relates to data partitioning for horizontal scaling. Presented herein are techniques that use a mapping between sparse and dense key spaces to generate an adaptive resolution histogram (ARH) that is well balanced for dataset partitioning.

BACKGROUND

Data partitioning is the process partitioning dataset based on ranges of values of either a key or a hashed key. The goal of partitioning is to create multiple non-overlapping subsets of the dataset that can be then manipulated and operated upon by multiple processing cores concurrently to achieve horizontal scaling without needing extensive synchronization or concurrency control mechanisms. With the advent of multicore processors connected together using modern interconnect technology, performance and scalability of numerous database operations may hinge on being able to partition the dataset accurately and efficiently. As a result, partitioning is a crucial step in several distributed database operations such as joining, sorting, and grouping.

Partitions can be chosen to be either a fixed number of partitions (of any size) or a fixed size of partitions (as many in number). Creating fixed-size partitions can be critical for performance on systems based on modern, low-power processors with limited local memories (such as caches). The partitions, which form the working set for distributed operation following the partitioning step, should fit in such local memories for optimal efficiency. Additionally, in-memory processing systems that lack persistent storage may have a strict limit on the maximum amount of data that can reside on each processing node. Thus, determining partition boundaries (i.e. splitters) accurately is not merely a performance requirement, but instead a functional requirement for in-memory processing. The data-driven partitioning problem is further complicated by the presence of skew in data that may cause statistical techniques that work well for uniformly-distributed data to yield poor results for skewed data. Determining the partition boundaries to create accurately sized partitions in presence of data skew may be computationally challenging.

Adaptive Resolution Histogram (ARH) is a technique for determining the partition boundaries in presence of data skew, as described in related U.S. patent application Ser. No. 14/621,204. ARH implementation includes two phases. The first phase involves constructing a trie (a.k.a. digital tree) data structure by processing input keys for data items to be partitioned. Leaf nodes in the trie represent finer granular buckets of the ARH. The second phase involves combining the leaf nodes of the trie to form appropriately sized partitions, and determine the splitter values. Besides partitioning, non-adaptive histograms are used in various forms by modern database systems to approximate the frequency distribution of values in attributes of relations to optimize query plans and estimate sizes of query results.

For ARH, there are practical challenges in achieving well balanced data partitions. Sparse key width may be arbitrarily long resulting in a wide range of potential values. Also unpredictable entropy in the dataset may cause a highly skewed data distribution. These factors significantly degrade detection and compensation of inherent skew in wide sparse key domain range for an ARH.

DETAILED DESCRIPTION

Figure 1:
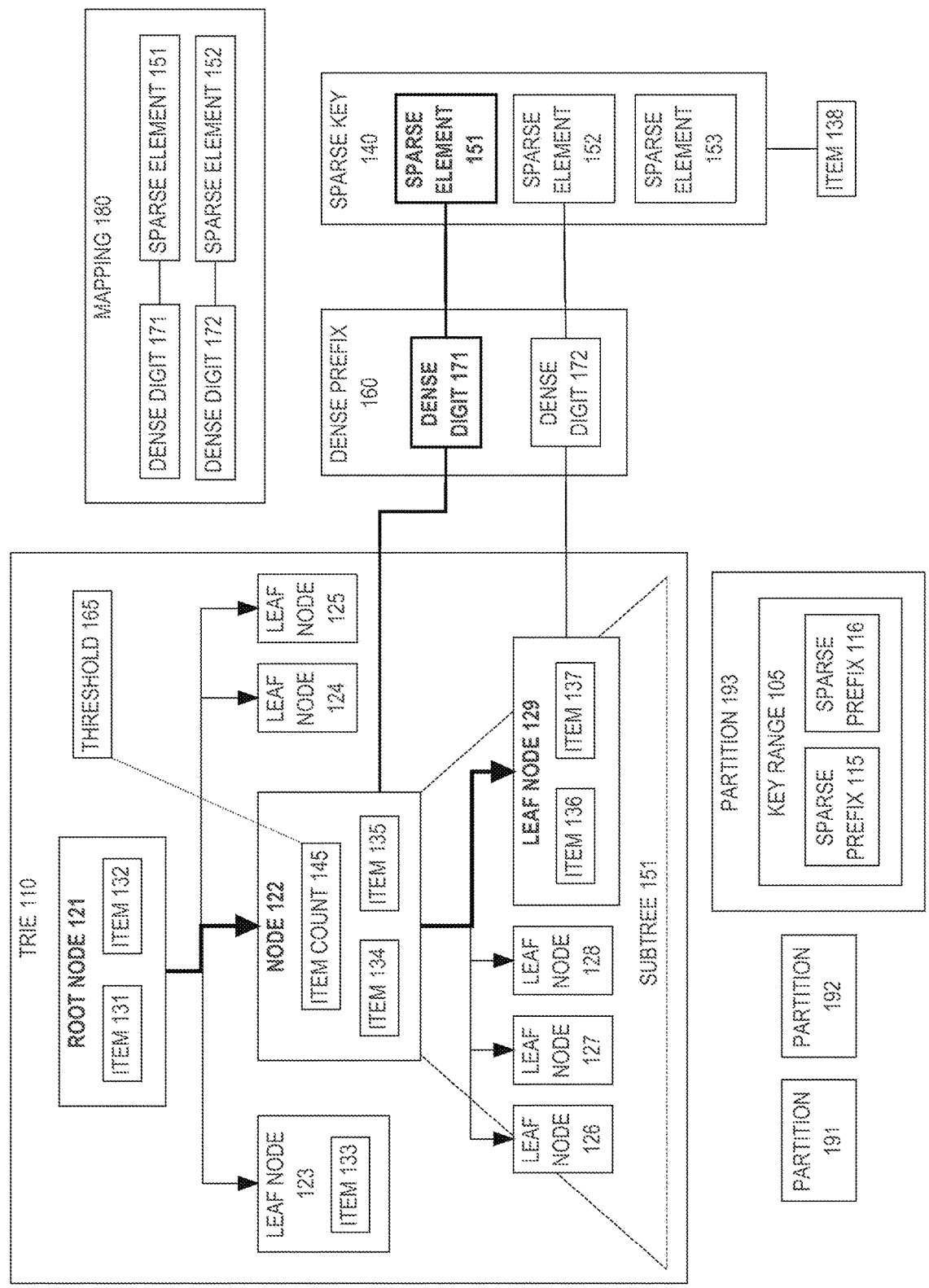
FIG. 1 is a block diagram that depicts an example computer that uses a mapping between sparse and dense key spaces to generate an adaptive resolution histogram (ARH) that is well balanced for dataset partitioning, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
   2.1 Sparse Key
   2.2 Sparse Element
   2.3 Mapping
   2.4 Dense Digit
   2.5 Trie
   2.6 Threshold
   2.7 Degree
   2.8 Traversal
   2.9 Leaf
   2.10 Partition
3.0 Example Partitioning Process
4.0 Reassignment
   4.1 Proportionality
5.0 Hardware Overview
6.0 Software Overview
7.0 Cloud Computing 1.0 General Overview Techniques are provided that use a mapping between sparse and dense key spaces to generate an adaptive resolution histogram (ARH) that is well balanced for dataset partitioning. Skew factor (i.e. imbalance) is a statistical measure of asymmetry of values in a dataset or amongst partitions of a dataset or between bins of a histogram. These new ARH techniques are experimentally proven to reduce skew factor between partitions to nearly one, which is ideal.

In an embodiment, a computer creates a mapping that associates each distinct sparse key with a respective distinct dense key. A natural sort ordering of the distinct dense keys reflects a natural sort ordering of the distinct sparse keys. The computer constructs and populates a trie by performing the following for each item of a dataset. Based on the item, the computer obtains a particular sparse key. For example, a sparse key may be a variable length text string that may be dictionary encoded to a dense key composed of a fixed amount of dense digits. The computer navigates from a root node of the trie to a particular node of the trie based on a (sub-)sequence of dense digits, such as a binary digit (i.e. bit) or a ternary (base 4) digit. Each dense digit of the (sub-)sequence of dense digits is based on the aforementioned mapping that associates a dense key comprised of dense digits with a respective sparse key. Each node of the trie identifies a dense prefix comprising dense digits of the (sub-)sequence of dense digits. The computer assigns the item to a target node that is selected, based on a threshold and a count of items that are assigned to a subtree of the trie that is rooted at the particular node, from nodes of the subtree. The computer determines a range of sparse keys for each partition of the dataset, based on: a count of items that are assigned to a node or subtree of the trie, dense prefixes of nodes of the trie, and the aforementioned mapping.

In embodiments, the mapping associates distinct dense digits individually with distinct sparse digits. Thus, a mapping of a particular sparse key to a particular dense key may be achieved through repeated use of the mapping of dense digits from sparse elements. For example, a sparse key may be a text string composed of characters that are individually mapped to dense digits.

Techniques herein determine partition boundaries for sparse keys of mixed lengths and with high likelihood for skew in the range distribution of the sparse keys. These techniques improve upon other ARH algorithms such that a variety of complex datatypes are handled well by improved splitting of trie nodes and improved calculation of partition boundaries (splitter values).

A data format used in sparse key representation may allow a much wider range of keys than what is actually present in the dataset. In embodiments, these ARH techniques are tunable using a threshold value that defines a maximum value of a trie node before the node needs splitting (by introducing child nodes). When a sparse key range is wider, and data has possibility of high skew, in order to construct well balanced partitions, other ARH techniques require a very low threshold value. In extreme cases, lesser threshold value leads ARH to perform poorly from a resource consumption perspective. Techniques herein efficiently handle data formats used in sparse key representations to cause ARH to operate on optimal key ranges.

2.0 Example Computer

FIG. 1 is a block diagram that depicts an example computer 100, in an embodiment. Computer 100 uses a mapping between sparse and dense key spaces to generate an adaptive resolution histogram (ARH) that is well balanced for dataset partitioning.

Computer 100 may be one or more of a rack server such as a blade, a mainframe, a personal computer, a smartphone, or other computing device able to load and analyze a huge dataset. The dataset (not shown) contains units of data, such as items 131-138, that computer 100 apportions to partitions, such us 191-193, for horizontally scaling a distributed program.

2.1 Sparse Key

For each of items 131-138, a sparse key that represents the item is obtained. For example, sparse key 140 represents item 138.

Sparse key 140 may be derived from data of item 138. In embodiments, computer 100 applies a hash function to item 138 to calculate sparse key 140 as a hash code that is hashed from item 138.

In embodiments, item 138 contains sparse key 140. For example, item 138 may be a relational database table row, and sparse key 140 may be a field of the row for a primary key column or other column or combination of columns.

2.2 Sparse Element

In embodiments as shown, sparse key 140 is composed of sparse elements, such as 151-153. Each of sparse elements 151-152 has a same fixed size.

For example, sparse key 140 may be a text string composed of sparse elements 151-153 as ASCII characters, or an integer composed of sparse elements 151-153 as bytes of different numeric significance, or a data structure composed of sparse elements 151-153 as discrete fields of the data structure. For example, bit-masking, byte array indexing, or register shifting, may be used to isolate/extract a particular sparse element of sparse key 140.

Although sparse elements 151-153 are stored at different offsets within sparse key 140, sparse elements 151-153 need not have distinct values. For example, sparse elements 151-152 may both store an A character.

Sparse keys for different items in a same dataset need not have a same amount of sparse elements. For example, sparse keys may be text strings of different lengths.

2.3 Mapping

Already existing is mapping 180 that, in the shown embodiment, associates each distinct possible sparse element value with a distinct dense digit, such as 171-172. For example, mapping 180 may be a lookup table. For example, mapping 180 may be stored in a file or a database table.

In embodiments not shown, mapping 180 instead associates whole sparse keys with whole dense keys, such as when variable width text strings are sparse keys that are dictionary encoded to integers as dense keys. In such embodiments, there need not be a one-to-one association between an individual sparse element and an individual dense digit, although such a correspondence is shown in FIG. 1.

Mapping 180 contains all of the distinct sparse element values that actually or potentially occur in the union of all sparse keys of items of the entire dataset. Thus, mapping 180 may contain additional sparse elements that incidentally do not actually occur in any sparse key of the dataset.

2.4 Dense Digit

In operation, computer 100 uses item 138 to obtain sparse key 140, and uses mapping 180 to translate individual sparse elements of sparse key 140 to individual dense digits, such as 171-172. Thus, one, some, or all of the sparse elements of sparse key 140 may be translated into dense digits.

For example, sparse key 140 may be text string "ABC". Likewise, sparse elements 151-153 may be respective characters A, B, and C.

For example, characters may be 7-bit ASCII codes or a 2-byte Unicode values. However if all of the potential sparse elements of sparse keys occur in an alphabetic range from A-Z, then only 26 distinct dense digits are needed in mapping 180.

Thus, a 5-bit dense digit is sufficient to represent a sparse element that may have one or two bytes. Likewise, if sparse elements 151-153 are longhand names (strings) of calendar months, then each dense digits may need only four bits.

Regardless of digit and element widths, all sparse elements are of a same first width, and all dense digits are of a same second width, likely smaller than the first width.

2.5 TRIE

In operation, computer 100 populates trie 110 with items 131-138 based on (sub-) sequences of dense digits as routing directives within the trie, as translated with mapping 180 from sparse keys, such as 140. Trie is a tree data structure that may be based on indirect references between tree nodes, such as pointers or offsets.

Initially, trie 110 is empty, such that it has no nodes. New nodes are inserted into trie 110 as needed during population of trie 110 with items 131-138.

One at a time, items 131-138 are added to trie 110. Because trie 110 initially lacks nodes, new root node 121 is inserted into trie 110 to accommodate a first item, which is 131.

Adding an item to trie 110 entails traversing trie 110 from root node 121 until a suitable node is reached to which the item may be assigned. Because multiple items may be assigned to a same node, most item assignments do not need a new node. For example, items 131-132 are both assigned to root node 121.

2.6 Threshold

However, eventually a node may fill to capacity with assigned items. Thus, threshold 165 is enforced to limit how many items may be assigned to any non-leaf (intermediate) node, such as 121-122.

Implementation of thresholding is shown in node 122. Various topological counts may be obtained for any node in trie 110, such as item count 145 that tallies how many items are assigned to node 122.

Another count (not shown) may provide a rollup tally of items assigned to subtree rooted at a node, such as subtree 151 rooted at node 122. A count may be lazily tallied on demand or eagerly recorded in a counter. For example, item count 145 may be a counter.

Although not shown as such, threshold 165 also applies to root node 121, and root node 121 has an item count similar to 145. For example, the value of the item count (not shown) of root node 121 is two because root node 121 has items 131-132.

In this example, threshold 165 may be set to two, which means that root node 121 is full. Thus, computer 100 should descend into trie 110 past root node 121 to add another item, such as 133.

2.7 Degree

Initially, root node 121 has no child nodes. Because root node 121 is full, new child node(s) are dynamically added to trie 110 to accommodate an additional item.

Trie 110 has a degree, which is the maximum amount of child nodes that a parent node may have. The degree of trie 110 may be as small as two (i.e. binary trie).

In this example, trie 110 has degree of four. Thus, four child nodes may be added to root node 121.

In embodiments, computer 100 always adds the maximum amount of child nodes, even if some child nodes remain empty. For example, computer 100 may add nodes 122-125 to root node 121 at a same time, even though only leaf node 123 is needed to accommodate item 133 being assigned.

In embodiments, computer 100 adds only one child node when a parent node's capacity is exceeded. For example, computer 100 may add only leaf node 123 when item 133 is assigned.

2.8 Traversal

When assigning an item to a node, descent into trie 110 occurs according to a (sub-) sequence of dense digits translated from a sparse key such as 140. For example, traversal to assign item 138 may occur as follows.

No dense digit is needed to reach root node 121. However, descent to a next level of trie 110 requires a dense digit for navigation to select a child node to visit.

The first sparse element of sparse key 140 is sparse element 151, which mapping 180 translates to dense digit 171, shown in dense prefix 160. When descending from root node 121 to the next level of trie 110, dense digit 171 is used to select one of child nodes 122-125.

Because the degree of trie 110 is four, root node 121 may have up to four child nodes. Thus, each dense digit should have four possible values.

Thus, each dense digit should have two bits. Thus, the correlation of a dense digit to the degree of trie 110 means that the degree of trie 110 should be a power of two for bitwise encoding.

Thus, each potential value of a dense digit corresponds to a respective child node of a parent node. For example, nodes 122-125 may respectively correspond to 2-bit values 0-3.

In this example, dense digit 171 corresponds to node 122. Thus, computer 100 descends during navigation for item 138 to node 122.

However, node 122 is also already full to capacity with items. Thus, a next sparse element 152 is translated to dense digit 172 to descend another level of trie 110.

In this example, dense digit 172 corresponds to leaf node 129 as a child node of node 122. Thus, computer 100 descends further to leaf node 129.

If at any level, descent for an item reaches a node that is not full to capacity, then descent ends for that item, and the item is assigned to that node. However, descent may sometimes reach a leaf node, such as 129, without finding a node with spare capacity.

2.9 Leaf

For example, descent for item 138 reaches leaf node 129 that is also full to capacity. Thus, computer 100 may add child node(s) (not shown) to leaf node 129 to accommodate item 138.

Leaf nodes may occur at different levels of trie 110. For example, leaf nodes 123 and 126 occur at different levels.

However, the depth (levels) of trie 110 is limited by the amount of sparse elements of a sparse key. In this example, all sparse keys have three sparse elements. Thus, root node 121 may have at most three levels beneath it.

Threshold 165 is not enforced at the maximum level of trie 110. Thus at the maximum level, a leaf node may indefinitely accumulate items.

Whereas, leaf nodes 123-129 are not at the maximum level and will instead grow their own child nodes as needed, based on threshold 165. For example, adding item 138 may cause leaf node 129 to become an intermediate/parent node with child node(s) (not shown).

2.10 Partition

Trie 110 is a more or less temporary data structure that is used to divide the dataset into partitions (such as 191-193) for distribution. Related U.S. patent application Ser. No. 14/621,204 describes techniques for deciding which of items 131-138 belong in which of partitions 191-193 based on which nodes 121-129 are the items assigned to, which is more or less summarized as follows.

Each partition comprises a disjoint (non-overlapping) range of sparse keys. For example, the sparse keys may be 5-digit postal zip codes.

Thus, partition 193 may contain all items whose mailing address has a zip code from 11223 thru 20000, as recorded by key range 105. In some embodiments, key range 105 need not be bounded by whole zip codes, but instead may be bounded by prefixes of zip codes.

For example, key range 105 may have sparse prefixes 115-116 that have respective zip code prefix values such as 1122 and 200, such that key range 105 covers zip codes from 1122X thru 200XX, where X is a wildcard that matches any sparse element.

However, items were sorted into trie 110 based on dense prefix (e.g. 160) rather than sparse key (e.g. 140). Although not shown, each node 122-129 is associated with a respective dense prefix.

Thus, mapping 180 should be used to reverse translate dense digits of nodes or of items at nodes into sparse elements that correspond to sparse keys or sparse prefixes such as 115-116.

Nodes of trie 110 have some correspondence to partitions 191-193. However, further processing may be needed to more determine a precise correlation of nodes 121-129 to partitions 191-193.

When adjacent nodes or subtrees have few items, then the items of the adjacent nodes or subtrees may be stored in a same partition, so long as the item count in the partition does not exceed a target partition size by more than some tolerance. Here, adjacency of partitions means adjacency of their key ranges. Thus, leaf nodes 123 and 126 may be adjacent, and 126 and 128 not be adjacent, even though 126 and 128 are sibling nodes.

If a subtree has too many items for one partition or too many items to finish filling a partially filled partition, then computer 100 may individually decide partitions for child nodes of the subtree. A leaf node with too many items for one partition or too many items to finish filling a partially filled partition may also contribute (spill over) items to an adjacent partition. In embodiments, all items having a same sparse key should share a same partition, regardless of a target partition size.

In embodiments, partitions 191-193 are filled with items of the dataset. In embodiments, computer 100 merely records the key ranges of partitions 191-193, but does not actually fill the partitions with items.

As soon as the partitions are populated, they are distributed to parallel processors for horizontal scaling. For example, each partition may be sent in a hypertext transfer protocol (HTTP) post to a separate remote computer.

Distribution of partitions may be deferred. For example, each partition may be stored in a separate file on a cross mounted filesystem that remote computers may eventually retrieve.

3.0 Example Partitioning Process

Figure 2:
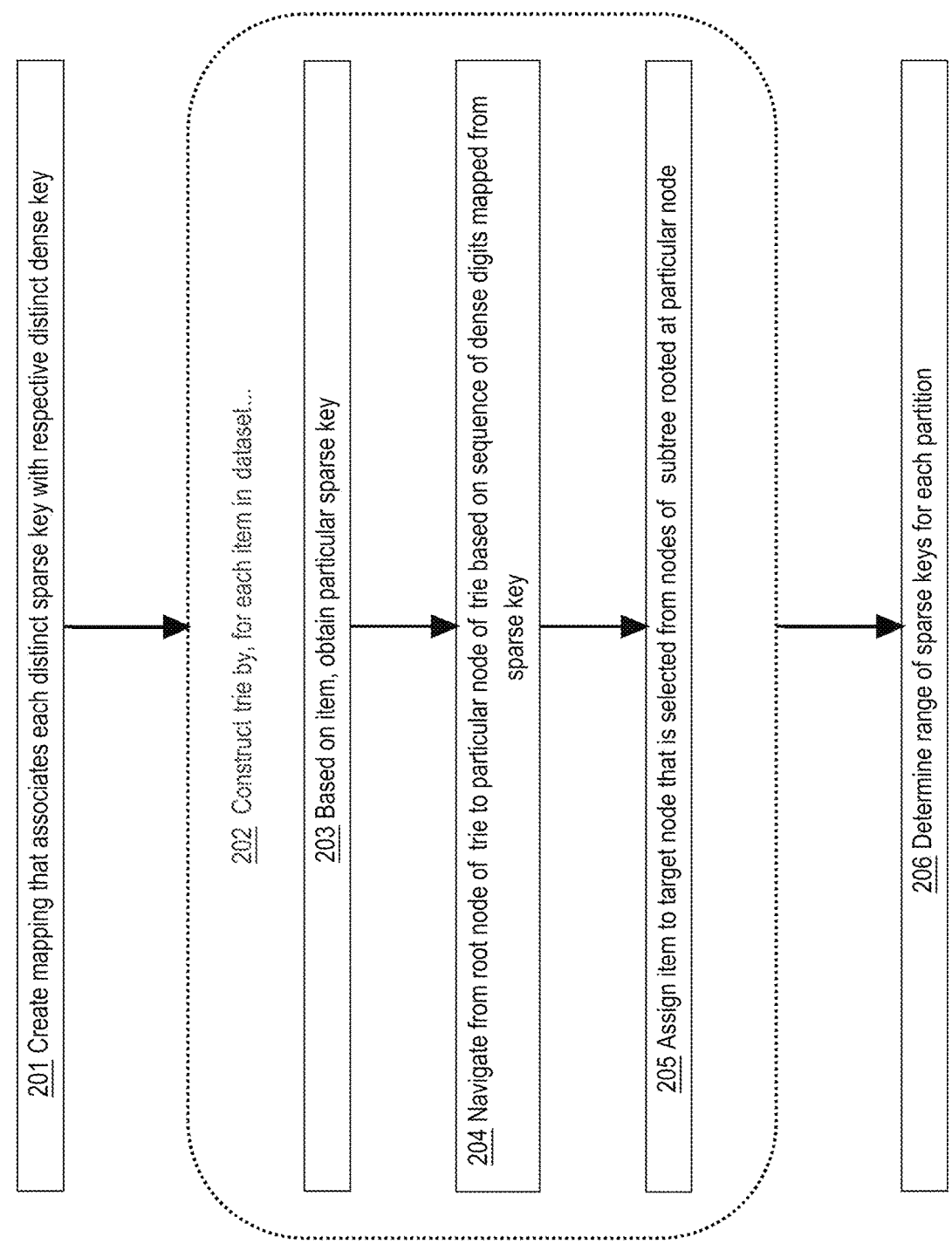
FIG. 2 is a flow diagram that depicts an example process that uses a mapping between sparse and dense key spaces to generate an ARH that is well balanced for dataset partitioning, in an embodiment.

FIG. 2 is a flow diagram that depicts an example process that uses a mapping between sparse and dense key spaces to generate an ARH that is well balanced for dataset partitioning. FIG. 2 is discussed with reference to FIG. 1.

Step 201 is preparatory. In embodiments, step 201 may occur before an actual dataset is obtained.

Step 201 creates a mapping. In embodiments, the mapping may be (durably) recorded for reuse with other datasets of a similar type.

In step 201, a mapping is created that associates each distinct sparse key that may potentially occur in a dataset with a respective distinct dense key. In embodiments, an engineer may use computer 100 to manually populate a lookup table of a relational database with pairs (tuples/rows) that each have a distinct dense key and a distinct sparse key.

In embodiments, a mapping is created that associates each distinct sparse element that may potentially occur in a dataset with a respective distinct dense digit. A lookup table may have pairs (tuples/rows) that each have a distinct dense digit and a distinct sparse element.

In embodiments, sparse elements are discovered by computer 100 sampling or exhaustively scanning the dataset. In embodiments, the mapping is an encoding dictionary. In embodiments, dense digits are automatically generated as integers that are dictionary keys.

In step 202, an empty trie is constructed and then populated with nodes by assigning each item of the dataset to a node of the trie. Trie population occurs according to steps 203-205 that are repeated for each item.

In step 203, a sparse key is obtained based on the item. For example, a sparse key may be extracted as a simple key from a field of the item, as a compound key from a combination of fields of the item, or may calculate the sparse key as a hash value based on field(s) of the item. In embodiments, the sparse key comprises at least one of: a natural language word, at least a portion of a street address, or a uniform resource identifier (URI) such as a uniform resource locator (URL).

The sparse key need not be unique to the item, unlike a database key. For example, item 138 may be a purchase order, and its order date may be sparse key 140, even though many orders may have the same order date and share sparse key 140.

In step 204, the computer traverses the trie from the root node to a particular node based on a (sub-)sequence of dense digits mapped from the sparse key. For example, sparse key 140 may be a text string, and sparse elements 151-153 may be the characters of the text string.

Descent through trie 110 begins at root node 121. If a count of items at root node 121 does not match or exceed threshold 165, then root node 121 has spare capacity, and item 138 is assigned to root node 121.

Otherwise, root node 121 is already full to capacity, and descent continues to a next level of trie 110 for item 138. In that case, a child node of root tree node 121 is selected based on the first dense digit, 171.

Mapping 180 is used to detect that sparse element 151 is mapped to dense digit 171. Dense digit 171 is used to select a child node of root tree node 121.

For example, each dense digit may have a 2-bit value that ranges from 0-3. Each value of that range may identify a respective child node, such as 122-125.

If the selected child node does not exist, then the child node is created. In embodiments, the new child node's sibling nodes (that share the same parent node) are also created.

In step 205, the item is assigned to a target node that is selected from nodes of subtree rooted at the selected child node. If the selected child node is full to capacity based on threshold 165, the traversal logic (steps 204-205) is repeated by using another dense digit (172) (perhaps obtained by mapping the next sparse element, 152) to descend an additional level.

Eventually, step 205 reaches a particular node with spare capacity or reaches the maximum depth of trie 110. The item is assigned to the particular node.

All sparse keys for the dataset need not have a same amount of sparse elements. For example, mapping 180 may be an encoding dictionary that associates variable width sparse keys with fixed width dense keys.

If descent exhausts the sparse elements of sparse key 140, then descent has reached the maximum depth of the trie. In that case, the current node in the traversal is permanently a leaf node, and item 138 is assigned to the leaf node, regardless of threshold 165.

Once steps 203-205 are performed for all items of the dataset, then construction and population of trie 110 is complete. In step 206, a range of sparse keys is determined for each partition.

For example, computer 100 may have a target amount of partitions and/or a target amount of items per partition. Based on that target amount, all of the items of the dataset are allocated into respective partitions based on the location of each item within trie 110, which is based on the dense digits associated with the item, which are mapped from the sparse elements of sparse key 140 using mapping 180.

Techniques for allocating items from trie nodes to partitions are discussed elsewhere herein. After step 206, trie 110 may be discarded (e.g. garbage collect or otherwise free involved memory).

4.0 Reassignment

Figure 3:
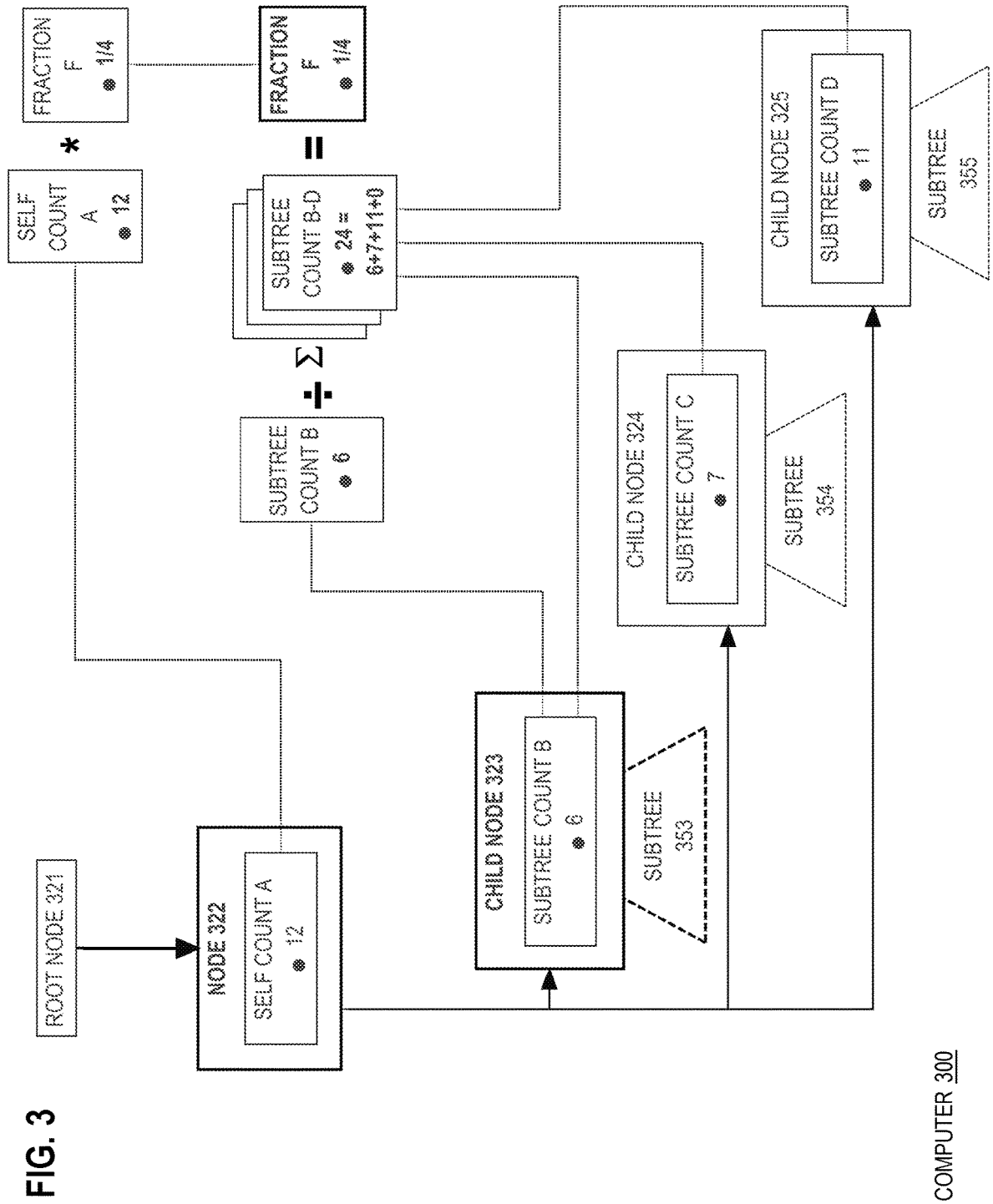
FIG. 3 is a block diagram that depicts an example computer that distributes items assigned to a non-leaf node down to nodes of a next level of a trie, in an embodiment.

FIG. 3 is a block diagram that depicts an example computer 300, in an embodiment. Computer 300 distributes items assigned to a non-leaf node down to nodes of a next level of a trie.

Computer 300 may be an implementation of computer 100. Nodes 321-325 and subtrees 353-355 are stored as a trie that computer 300 constructs and populates in memory.

After populating the trie, the trie is used to create and populate partitions of a dataset. The partitions are populated only with data items assigned to leaf nodes of the trie.

Thus, computer 300 should reassign items from non-leaf nodes to leaf nodes before populating the partitions. In embodiments not shown, items are reassigned from non-leaf nodes after all of the items of the dataset are assigned to nodes of the trie.

In the shown embodiment, items are dynamically reassigned from non-leaf nodes while items are still being assigned to nodes of the trie. In the shown embodiment, all items of a non-leaf node are reassigned when the non-leaf node overflows (i.e. fills to capacity) according to a threshold (not shown).

In embodiments not shown, only a subset of items of a non-leaf node are reassigned when the non-leaf node overflows. For example, half of the items of the non-leaf node may be reassigned.

4.1 Proportionality

In embodiments not shown, items are reassigned in equal amounts to child nodes of a non-leaf node. In the shown embodiment during assignment of items to nodes, items are dynamically reassigned to child nodes according to an arithmetic formula based on self count A of items assigned to overflowing node 322 and subtree counts B-D of items assigned to subtrees 353-355 that are rooted at child nodes 323-325 of overflowing parent node 322.

To decide a portion of items to reassign from a parent node to a particular child node, fraction F may be calculated as a proportion of items to be reassigned to the child node. For example, fraction F of parent node 322's twelve (self count A) items may be reassigned to child node 323.

Fraction F is separately calculated for each of child nodes 323-325. In the shown embodiment, items are reassigned from parent node to child nodes in proportion to counts of items assigned to subtrees rooted at the child nodes.

Thus, fraction F is a count of items assigned to a subtree rooted at the particular child node divided by the sum of counts of items assigned to subtrees of all of the child nodes of the parent node, including the particular child node. Thus for child node 323, fraction F=(subtree count B)/Σ(subtree counts B-D)=6/(6+7+11+0)=6/24=¼.

Thus, a quarter of parent node 322's items (12/4=3 items) would be reassigned to child node 323 if parent node 322 were to overflow while counts A-D have their shown values. However, counts A-D are dynamic and may change when each item is assigned to a node of the tree.

Thus, fraction F for child node 323 may change while the trie is being populated with items. The zero in the above math is for demonstrative purposes to show that parent node 322 has an implied additional empty child node not shown because the trie has a degree of four.

Reassignment may be recursive if it causes a child node to overflow. Multiple sibling child nodes may overflow together, although from different values for fraction F.

While the trie is being populated, overflowing always begins with root node 321. Subsequently added items may cause repeated overflows.

As a worst case, dynamic reassignment from root node 321 causes every node of the trie to also overflow in a cascading way.

As described above, fractional reassignment occurs while the trie is being populated. However once population finishes, further reassignment may be necessary because all items should be assigned to leaf nodes for partitioning.

Such final reassignment may occur according to techniques described above such as proportional fractions, equal amounts, or actual sorting by dense digits mapped from sparse keys of the items being reassigned.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
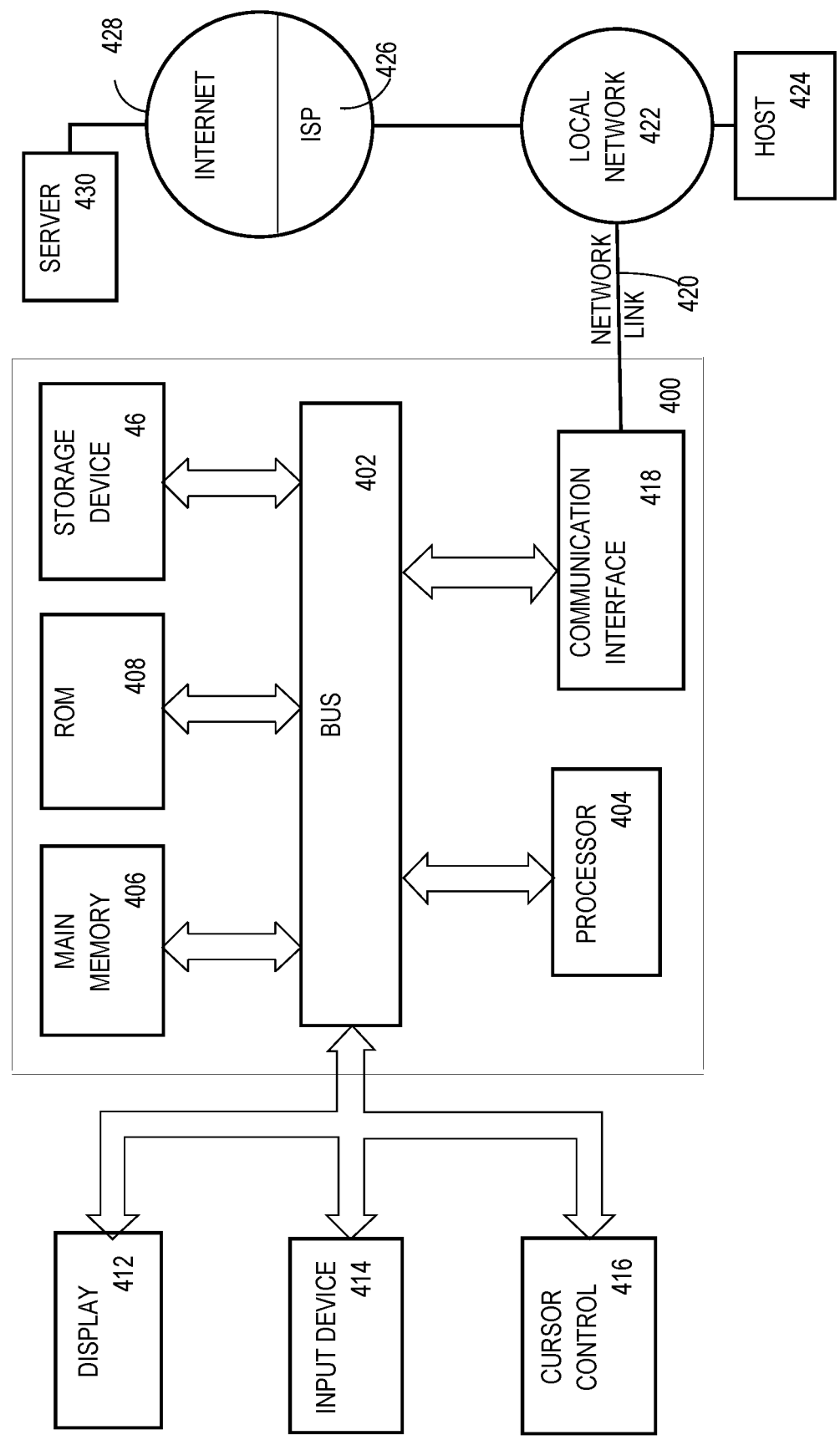
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 46, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 46. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 46. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 46 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 46, or other non-volatile storage for later execution.

6.0 Software Overview

Figure 5:
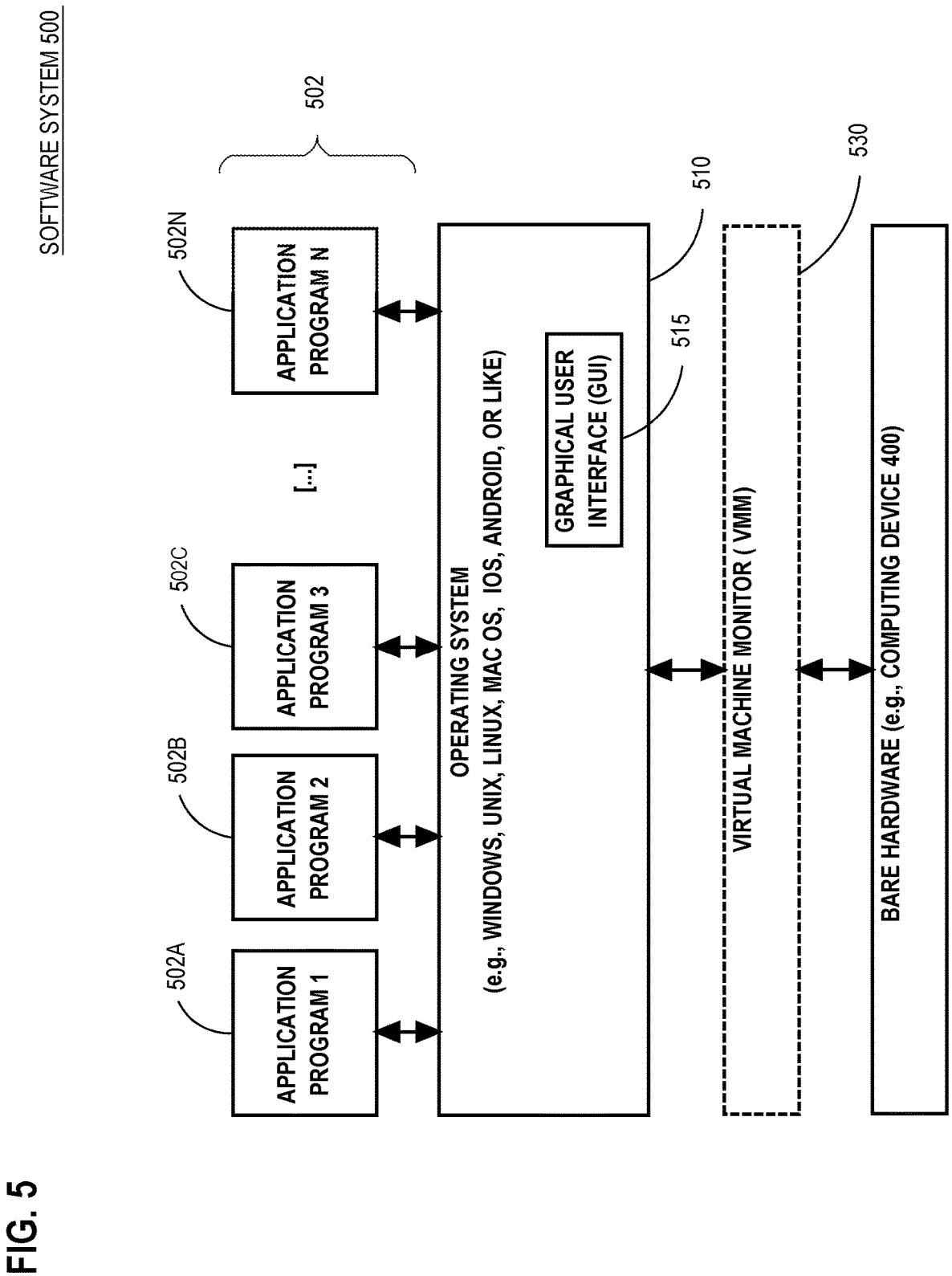
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 46, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 46 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

7.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements.

For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 creating a one-to-one mapping that associates each sparse element of a plurality of distinct sparse elements with a respective dense digit of a plurality of distinct dense digits that have a same fixed size, wherein a natural sort ordering of the plurality of distinct dense digits reflects a natural sort ordering of the plurality of distinct sparse elements;

constructing a trie by, for each item of a plurality of items:
obtaining, based on the item, a particular sparse key comprising a sequence of sparse elements of the plurality of distinct sparse elements;
obtaining, based on said one-to-one mapping that associates said each sparse element with said respective dense digit, a sequence of dense digits that represents said sequence of sparse elements;
navigating from a root node of the trie to a particular node of the trie based on said sequence of dense digits, wherein
each node of the trie identifies a dense prefix comprising at least one dense digit of the sequence of dense digits;
assigning the item to a target node that is selected, based on a threshold and a count of items of the plurality of items that are assigned to a subtree of the trie that is rooted at the particular node, from nodes of the subtree;

determining a range of sparse keys for each partition of a plurality of partitions of the plurality of items, based on: a count of items that are assigned to a node or subtree of the trie, dense prefixes of nodes of the trie, and said mapping;

wherein the method is performed by one or more computing devices.

2. The method of claim 1 wherein determining the range of sparse keys comprises determining a pair of sparse prefixes.

3. The method of claim 1 wherein navigating a path from a root node of the trie to a particular node of the trie comprises, for each non-leaf node along the path having an amount of assigned items that exceeds a threshold, reassigning items that are assigned to the non-leaf node to immediate child nodes of the non-leaf node.

4. The method of claim 3 wherein reassigning items that are assigned to the non-leaf node comprises reassigning a subset of items that are assigned to the non-leaf node.

5. The method of claim 1 further comprising after constructing the trie, for each non-leaf node of the trie:
determining a first amount of items assigned to the non-leaf node;
for each child node of immediate child nodes of the non-leaf node:
determining:
a second amount of items assigned to nodes of a subtree rooted at the child node,
a first fraction comprising a ratio of the second amount of the child node to a sum of the second amounts of each node of the immediate child nodes of the non-leaf node, and
a third amount of items that comprises a multiplicative product of the first amount and the first fraction; and
reassigning the third amount of items from the non-leaf node to the child node.

6. The method of claim 1 wherein the sparse key for the item and the sparse key for a second item of the plurality of items contain different amounts of sparse elements.

7. The method of claim 1 wherein at least one node of the trie has more than two immediate child nodes.

8. The method of claim 1 wherein the sparse key for the item comprises at least one of: a natural language word, at least a portion of a street address, or a uniform resource identifier (URI).

9. The method of claim 1 further comprising sampling the plurality of items to determine the plurality of distinct sparse elements.

10. The method of claim 1 wherein each dense digit of the plurality of distinct dense digits contains fewer than seven bits.

11. One or more non-transitory computer-readable media storing instructions that, when executed by one or more processors, cause:
creating a one-to-one mapping that associates each sparse element of a plurality of distinct sparse elements with a respective dense digit of a plurality of distinct dense digits that have a same fixed size, wherein a natural sort ordering of the plurality of distinct dense digits reflects a natural sort ordering of the plurality of distinct sparse elements;

constructing a trie by, for each item of a plurality of items:
obtaining, based on the item, a particular sparse key comprising a sequence of sparse elements of the plurality of distinct sparse elements;
obtaining, based on said one-to-one mapping that associates said each sparse element with said respective dense digit, a sequence of dense digits that represents said sequence of sparse elements;
navigating from a root node of the trie to a particular node of the trie based on said sequence of dense digits, wherein
each node of the trie identifies a dense prefix comprising at least one dense digit of the sequence of dense digits;
assigning the item to a target node that is selected, based on a threshold and a count of items of the plurality of items that are assigned to a subtree of the trie that is rooted at the particular node, from nodes of the subtree;

determining a range of sparse keys for each partition of a plurality of partitions of the plurality of items, based on: a count of items that are assigned to a node or subtree of the trie, dense prefixes of nodes of the trie, and said mapping.

12. The one or more non-transitory computer-readable media of claim 11 wherein determining the range of sparse keys comprises determining a pair of sparse prefixes.

13. The one or more non-transitory computer-readable media of claim 11 wherein navigating a path from a root node of the trie to a particular node of the trie comprises, for each non-leaf node along the path having an amount of assigned items that exceeds a threshold, reassigning items that are assigned to the non-leaf node to immediate child nodes of the non-leaf node.

14. The one or more non-transitory computer-readable media of claim 13 wherein reassigning items that are assigned to the non-leaf node comprises reassigning a subset of items that are assigned to the non-leaf node.

15. The one or more non-transitory computer-readable media of claim 11 wherein the instructions further cause after constructing the trie, for each non-leaf node of the trie:
determining a first amount of items assigned to the non-leaf node;

for each child node of immediate child nodes of the non-leaf node:

determining:

a second amount of items assigned to nodes of a subtree rooted at the child node, a first fraction comprising a ratio of the second amount of the child node to a sum of the second amounts of each node of the immediate child nodes of the non-leaf node, and a third amount of items that comprises a multiplicative product of the first amount and the first fraction; and reassigning the third amount of items from the non-leaf node to the child node.

16. The one or more non-transitory computer-readable media of claim 11 wherein the sparse key for the item and the sparse key for a second item of the plurality of items contain different amounts of sparse elements.

17. The one or more non-transitory computer-readable media of claim 11 wherein at least one node of the trie has more than two immediate child nodes.

18. The one or more non-transitory computer-readable media of claim 11 wherein each dense digit of the plurality of distinct dense digits contains fewer than seven bits.

* * * * *